United States Patent [19]
Conforti et al.

[11] Patent Number: 5,208,803
[45] Date of Patent: May 4, 1993

[54] CIRCUIT FOR TESTING DIGITAL LINES

[75] Inventors: Joseph A. Conforti, Phoenix; Thomas C. Bissonnette; Anthony J. Baca, both of Glendale, all of Ariz.

[73] Assignee: AG Communication Systems Corporation, Phoenix, Ariz.

[21] Appl. No.: 615,529

[22] Filed: Nov. 19, 1990

[51] Int. Cl.$^5$ .................... H04J 01/16; H04J 03/14
[52] U.S. Cl. .................... 370/013; 370/017; 371/20.1; 379/29
[58] Field of Search .................. 370/13, 17, 14; 371/8.2, 11.2, 20.1, 22.3; 379/399, 1, 4, 5, 19, 21, 27, 29; 375/10; 455/67.1

[56] References Cited
U.S. PATENT DOCUMENTS

| | | | |
|---|---|---|---|
| 4,551,585 | 11/1985 | Daniels et al. | 370/13 |
| 4,606,019 | 8/1986 | Takai | 370/104.1 |
| 4,611,320 | 9/1986 | Southard | 370/17 |
| 4,730,313 | 3/1988 | Stephenson et al. | 370/17 |
| 4,841,520 | 6/1989 | Steely | 370/13 |
| 4,878,048 | 10/1989 | Gottesman et al. | 370/13 |
| 4,894,824 | 1/1990 | Hemmady et al. | 370/58.3 |
| 4,965,795 | 10/1990 | Coffelt et al. | 370/13 |
| 4,996,695 | 2/1991 | Dack et al. | 370/13 |
| 4,998,240 | 3/1991 | Williams | 370/17 |
| 5,027,343 | 6/1991 | Chen et al. | 370/13 |

Primary Examiner—Douglas W. Olms
Assistant Examiner—Dang Ton
Attorney, Agent, or Firm—Anthony J. Baca

[57] ABSTRACT

A digital test card for testing the quality of a digital system in a central office system is disclosed. Where the digital system consists of a digital line card connected to a customer premise equipment by a two-wire connection. The digital test card comprises a line interface which provides a full duplex transmission link. When the digital test card is testing the customer premises equipment the line interface operates as a master; when testing the digital line card the line interface operates as a slave. There is also a relay for connecting the line interface to the customer premise equipment or the digital line card. Connected between the line interface and the central office system is a buffer. A protocol controller connected to the line interface performs a packet protocol. And finally there is a processor. Under the direction of the central office system, the processor controls the operation of the digital line card and determines the quality of the digital system.

12 Claims, 9 Drawing Sheets

CIRCUIT FOR TESTING DIGITAL LINES

CROSS-REFERENCE TO RELATED APPLICATIONS

The present application is related to the following co-pending U.S. patent applications all being assigned to the same assignee, entitled:

"A DIGITAL TELEPHONE SYSTEM", Ser. No. 07/615,528 field on Nov. 19, 1990

"A MESSAGE ARRANGEMENT AND METHOD USED TO IMPLEMENT A DIGITAL TELEPHONE SYSTEM", Ser. No. 07/615/523 filed on Nov. 19, 1990, and;

"A METHOD OF DOWNLOADING DATA TO A PLURALITY OF DESTINATIONS IN A TELEPHONE SYSTEM", Ser. No. 07/615,522 filed on Nov. 19, 1990.

FIELD OF THE INVENTION

The present invention relates in general to telecommunication systems, and more particularly, to a test card for testing digital systems.

BACKGROUND OF THE INVENTION

While it is true that most of today's telephone lines are analog, there is a push to convert to a digital link between the Central Office (CO) and the Customer Premise Equipment (CPE). With the transformation to digital telephone systems, the contemporary test equipment is of limited value.

The present test equipment requires that testing be performed while the CPE is on-hook. However, with a digital telephone system the line is always active. To use the present test equipment would require that the CPE be capable of disconnecting itself from the line (go on-hook). While this may be possible, it adds to the complexity and cost of the CPE. There are other problems; how long should it stay on-hook; if a call is received during the test, how can the CPE be notified to abort the testing.

It therefore becomes the object of the present invention to provide a test card for testing digital lines without adding to the complexity or cost of the CPE.

SUMMARY OF THE INVENTION

In order to accomplish the object of the present invention there is provided a digital test card for testing the quality of a digital system in a central office system. Where the digital system consists of a digital line card connected to a customer premise equipment by a two-wire connection.

The digital test card comprises a line interface which provides a full duplex transmission link. When the digital test card is testing the customer premises equipment the line interface operates as a master, when the digital test card is testing the digital line card the line interface operates as a slave. There is also a relay for connecting the line interface to the customer premise equipment, in the alternative the relay connects the line interface to the digital line card.

Connected between the line interface and the central office system is a buffer which converts data between the line interface and the central office system. A protocol controller connected to the line interface performs a packet protocol. And finally there is a processor connected to the protocol controller, the line interface, the buffer, and to the central office system. Under the direction of the central office system, the processor controls the operation of the digital test card and, through the protocol controller and the buffer means, determines the quality of the digital system.

DESCRIPTION OF THE DRAWINGS

A better understanding of the invention may be had from the consideration of the following detailed description taken in conjunction with the accompanying drawings, in which.

DESCRIPTION OF THE PREFERRED EMBODIMENT

The present invention tests both the near-end and far-end of a two-wire digital line. The present invention is capable of being remotely switched onto a line to replace a defective digital line card, also known as spare line switching. Additionally, the present invention can be used to transmit and receive data over the PCM network; this function can be used to down-load software to other cards and diagnostic functions.

The present invention requires only two wires, yet, provides a total of four channels, two 64 Kbps channels (voice or data), a 16 Kbps channel for communications between the CPE and the line card, and a 8 Kbps auxiliary channel for communications with other devices on the line, (i.e. repeaters) and/or with the CPE.

Figure 1:
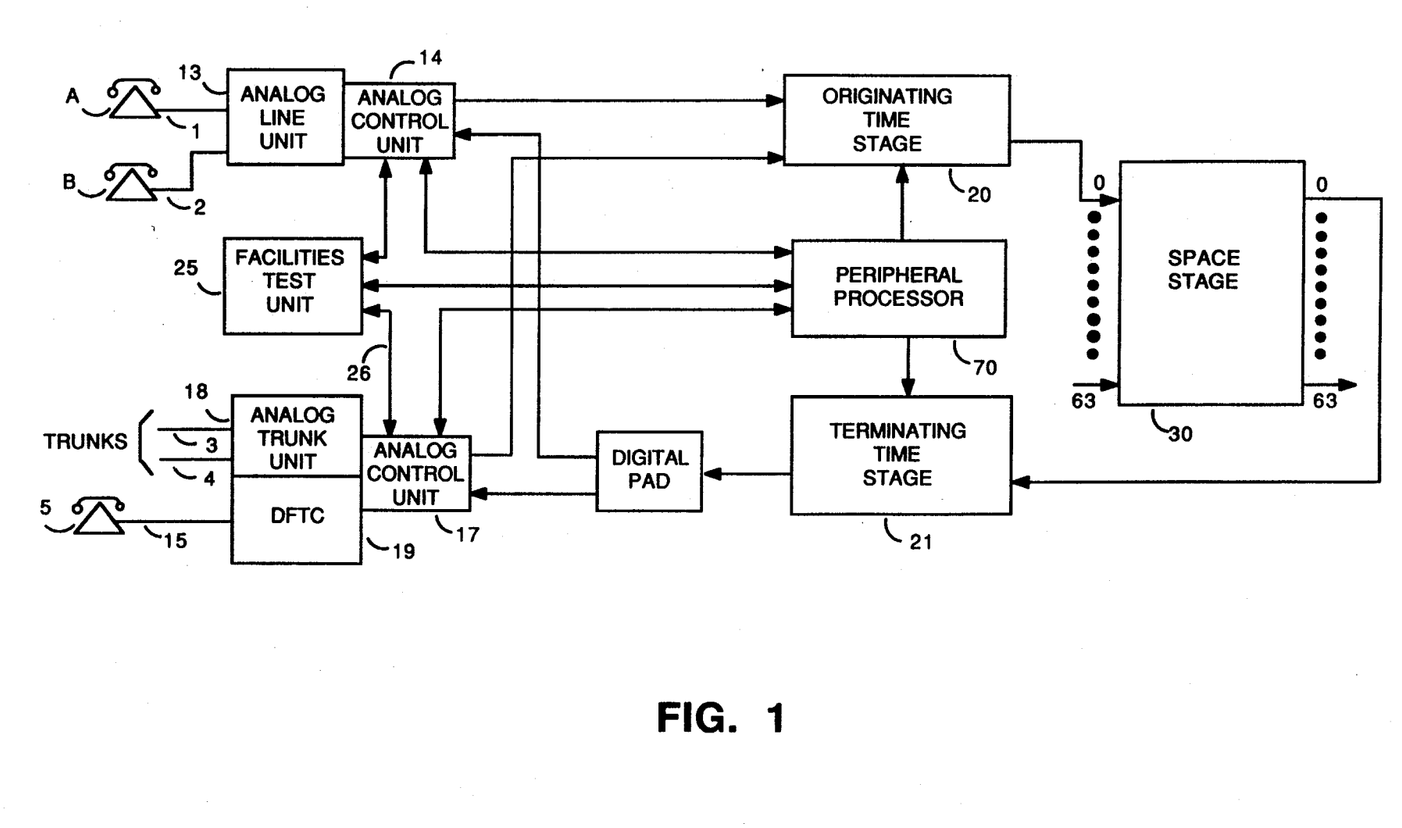
FIG. 1 is a block diagram of a network system embodying the present invention.

Referring to FIG. 1, a central office (CO) system is shown. Standard telephone instruments A and B are connected to Analog Line Unit 13, via analog subscriber lines 1 and 2. The analog data received is converted to Pulse Coded Modulation (PCM) by Analog Line Unit 13 (ALU). The PCM digital data is next sent from ALU 13 through Analog Control Unit 14 (ACU) to Originating Time Switch 20 (OTS). PCM data received from the other end is received by ALU 13 from Terminating Time Switch 21 (TTS) through ACU 14. ALU 13 converts the received PCM data to an analog signal which is transmitted down subscriber lines 1 and 2. ALU 13 is also connected to ACU 14, which in turn, is connected to Peripheral Processor 70.

Terminating Time Switch is further connected to Trunk Unit 18 through ACU 17. Trunks 3 and 4 provide access to subscribers not directly served by this system.

Facilities Test Unit 25 (FTU) is connected to all ACUs by a pair of test busses; Test Bus In and Test Bus Out. The FTU includes a set of analog test equipment for determining the status of any line. Under control of PP 70, the FTU performs various electrical and acoustical tests on the lines of the system.

The Digital Facilities Test Card (DFTC) 19 of the present invention is connected to ACU 17 and provides an interface for one CPE. However, due to the nature of this card, telephone 5 would not generally be implemented. Through a set of relays, the DFTC has access to outgoing line 15 and test bus 26. With these relays and the aid of FTU 25, the DFTC 19 can be connected to any line card or any line within the system.

Figure 2:
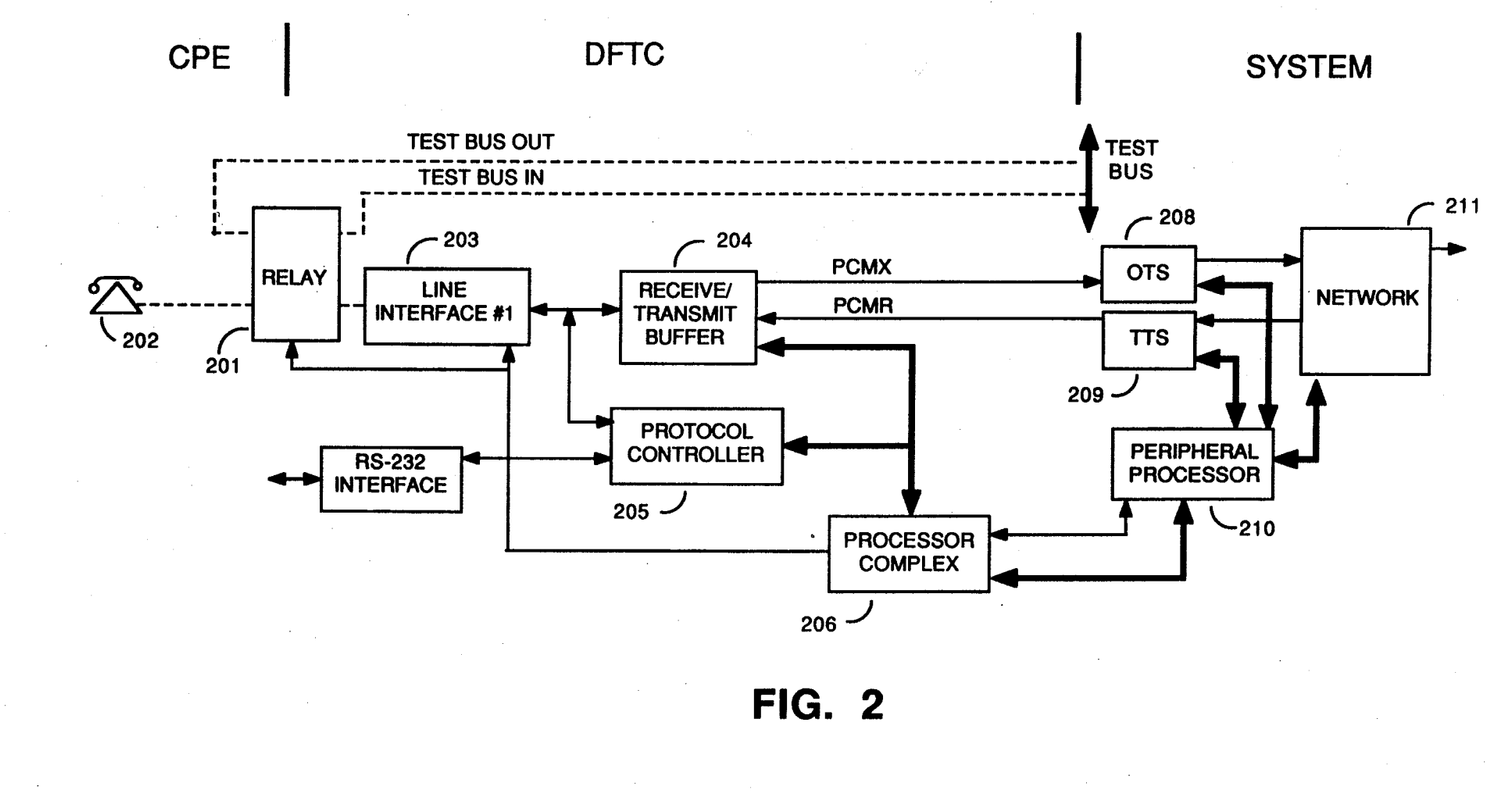
FIG. 2 is a high-level block diagram of the Digital Facilities Test Card.

Turning now to FIG. 2, a block diagram illustrating the DFTC is shown. The DFTC interfaces to the CPE 10 (or Unit Under Test UUT) through a single, two-wire communication link. The two-wire interface provides a high-speed, full duplex digital transmission link using echo-cancelling techniques. A total of four digital channels are provided: two 64 Kbps channels, one 16 Kbps channel and one 8 Kbps channel. Where, the 64 Kbps channels can be used for PCM voice or high-speed data, the 16 Kbps channel is used to communicate with the UUT, and the 8 Kbps auxiliary channel is used to communicate with other devices on the line, (i.e. repeaters) and/or with the CPE. The two-wire communication link can be redirected, by RELAY 201, to the test busses.

The DFTC interfaces to the system by a PCM interface and a sense/control interface. Data over the PCM interface is transferred to Originating Time Switch (OTS) 208 and received from Terminating Time Switch (TTS) 209. This data is either digitized voice data or circuit switched data and has a data rate of 64 Kbps. (Herein: PCM data means either digitized voice or circuit switched data.)

Through the sense/control interface, PERIPHERAL PROCESSOR (PP) 210 communicates with DFTC processor 206, which in turn communicates to the UUT. The sense/control interface consists of eight data lines, four address lines, and associated control lines. Only high-level messages are passed through this interface.

When PP 210 sends a message to DFTC, it writes the message into the DFTC's input buffer, then sets a SYSDFTC flag on the DFTC. The DFTC, upon receiving the SYSDFTC flag, reads the message and resets the flag indicating to PP 210 that it is ready for another message. Conversely, when the DFTC sends a message to PP 210, it writes the message into its output buffer and sets a DFTCSYS flag. When PP 210 sees the DFTCSYS bit set it reads the message from the DFTC and resets the DFTCSYS flag.

PROTOCOL CONTROLLER 205 handles the "bit-level" protocol conversion thereby providing a very reliable data link between the DFTC and the UUT. PROTOCOL CONTROLLER 205 also provides a serial port which can be used during software design and testing.

RECEIVE/TRANSMIT BUFFER 204 converts the serial data between the different bit rates of LINE INTERFACE 203, and OTS 208, provides a time switch stage, and performs a trap and insert function. The trap/insert function allows the DFTC's processor 206 to place known data patterns onto the PCM data stream and receive data from the PCM data stream. This function is used to perform diagnostic testing and uploading/downloading of software. Note: Software uploading/downloading is discused in more detail in co-application "A METHOD OF LOADING DATA TO A PLURALITY OF DESTINATIONS IN A PHONE SYSTEM", Ser. No. 07/615,522 filed on Nov. 19, 1990.

LINE INTERFACE 203 converts the digital data into an appropriate signal for transmission over the twisted-pair line. The signal from the LINE INTERFACE first passes through RELAY 201. At RELAY 201, the signal is diverted to one of three busses; LINE OUT, TEST BUS OUT, or TEST BUS IN. The LINE OUT bus directs the signal to the two-wire interface associated with that card slot, in this case, line out is connected to phone 202. The Test busses (TEST BUS IN and TEST BUS OUT) are a common bus between all card slots of all ALUs.

Figure 3:
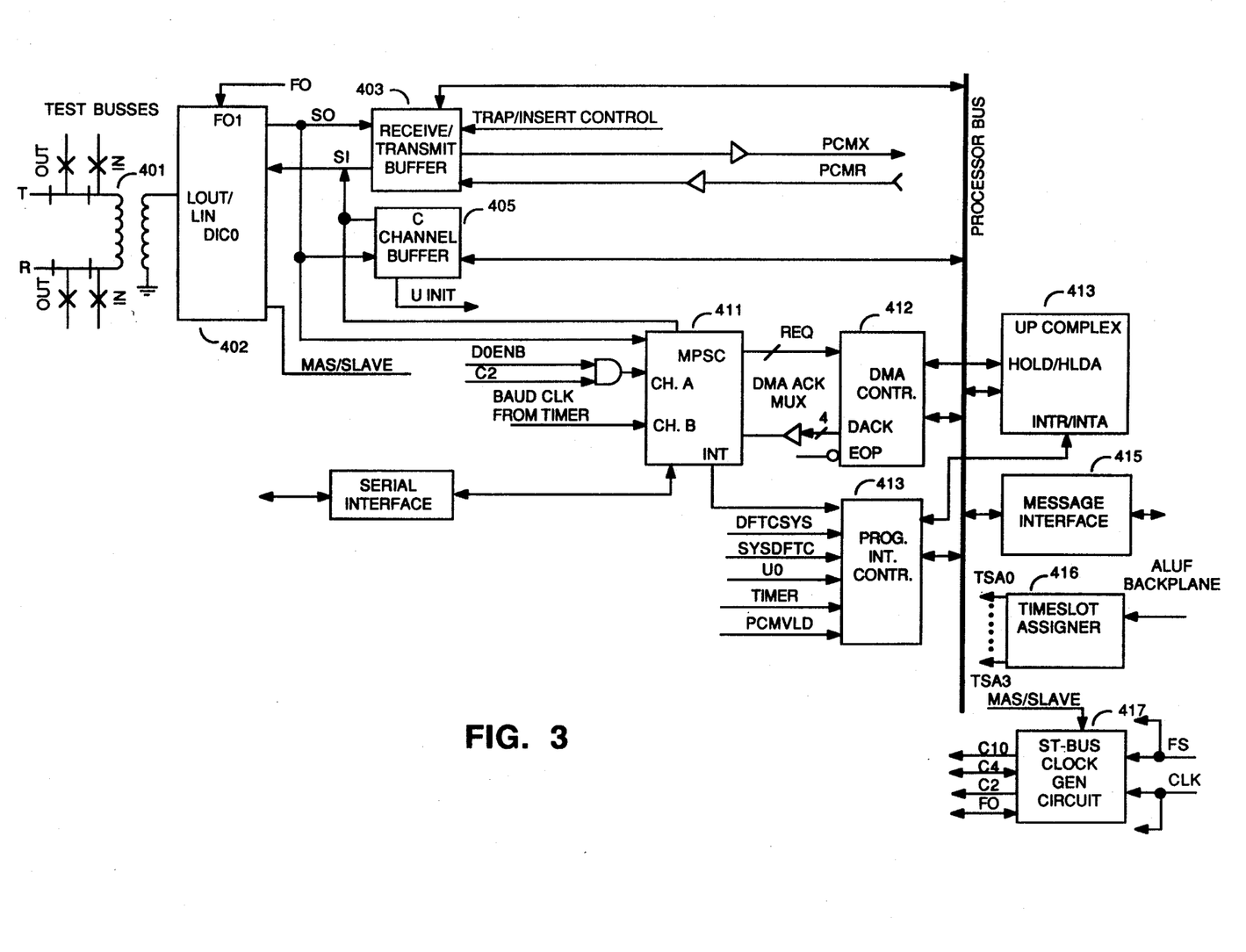
FIG. 3 is a low-level block diagram of the Digital Facilities Test Card.
Figure 4:
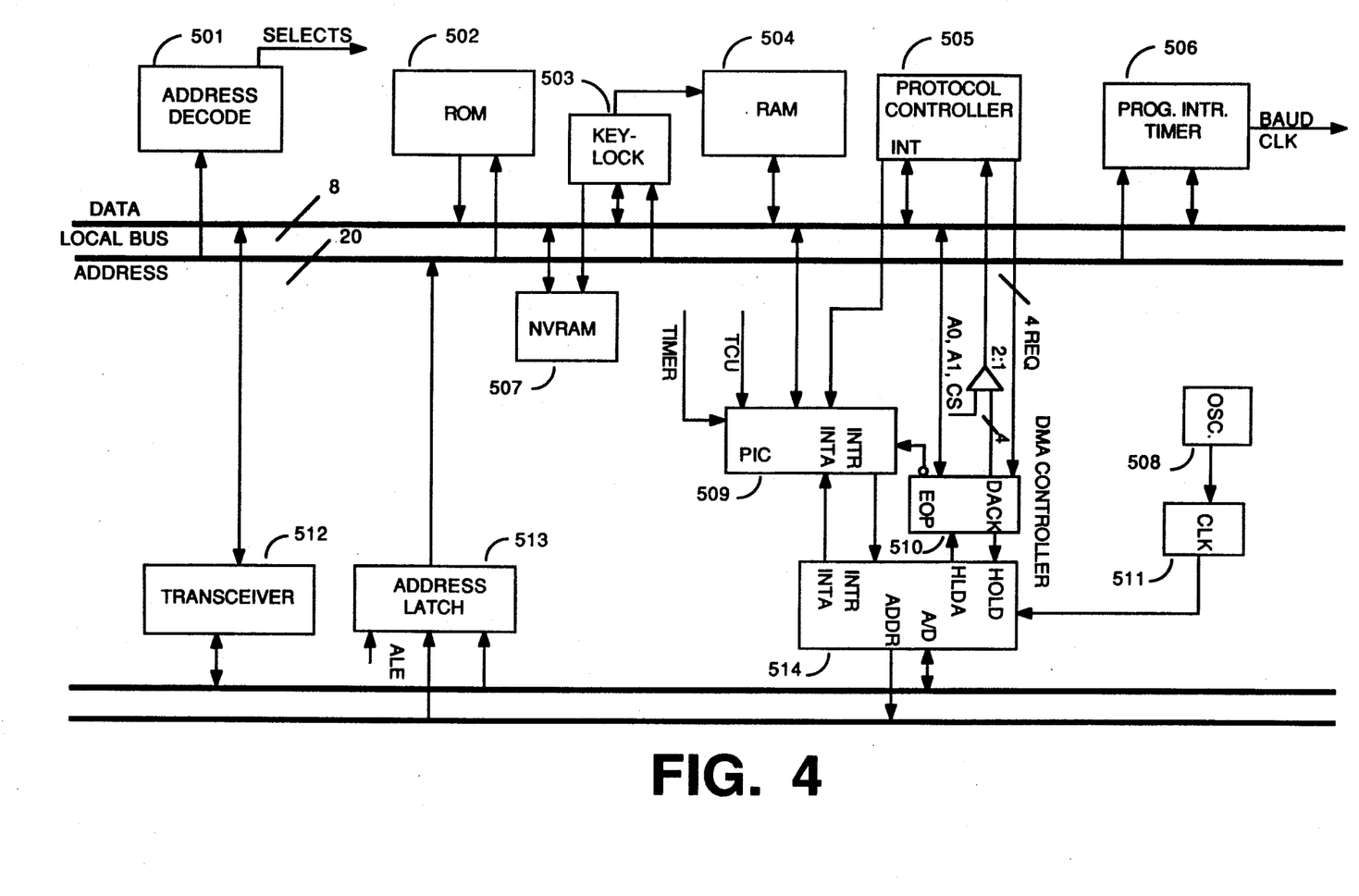
FIG. 4 is a block diagram of the Digital Facilities Test Card's microprocessor complex.

Referring now to FIGS. 3 and 4, a more detailed description will be given. FIG. 3 shows a more detailed block diagram of the DFTC, while FIG. 4 shows the processor complex in greater detail.

TRANSFORMER 401 and Digital Interface Chip (DIC) 402 implement LINE INTERFACE 203 of FIG. 2. The DIC provides an interface between the line (Tip-and-Ring) on one side, and a Time Division Multiplexed (TDM) serial data-stream on the other. DIC 402 uses four TDM time-slots; two channels for the high-speed data, one channel for the link with the UUT, and a channel for control and status of the DIC itself. Note: The auxiliary channel is part of the control/status channel. The RELAY 201 of FIG. 2 is shown as "MAKE/BREAK" on the Tip (T) and Ring (R) lines. A straight vertical line represents the connection that is made when the relay is in the relaxed state, while an x indicates the connection that will be made when the relay is energized.

RECEIVE/TRANSMIT BUFFER 403, converts the bit-rate between the system (PCMX and PCMR) and the DIC while preserving the overall data-rate of the channel. Depending on the mode of operation, either master or slave, RECEIVE/TRANSMIT BUFFER 403 is under the control of either TIMESLOT ASSIGNER 416 and CLOCK GENERATOR 417 or DIC 402 and CLOCK GENERATOR 417 respectively. Master and slave modes of operation are discussed in more detail infra. TIMESLOT ASSIGNER 416 is programmed by the external peripheral processor and determines the time slots for each high-speed channel on the PCMX and PCMR busses. CLOCK-GENERATOR 417 produces all the timing signals needed by DIC 402 and, when in the master mode, is phased locked to a master clock signal provided by the system. When the DIC is in the slave mode, DIC 402 generates the signals C4 and FO. Under the control of CLOCK-GENERATOR 417, the buffers are enabled, during the proper time-slot, to receive and transmit serial data from the DIC.

CLOCK-GENERATOR 417 also provides timing for C CHANNEL BUFFER 405 and Multi-Protocol Serial Controller (MPSC) 411. The C CHANNEL BUFFER provides an interface between PROCESSOR COMPLEX 414 and DIC 402. Through this channel, PROCESSOR COMPLEX 414 can control certain internal functions of the DIC and monitor internal status. The C CHANNEL BUFFER converts the data between the parallel format of PROCESSOR COMPLEX 414 and the serial format of DIC 402 and allows PROCESSOR COMPLEX 414 to operate asynchronously to DIC 402. The C CHANNEL BUFFER as used in the present invention is taught in application "AN INTERFACE CIRCUIT FOR DATA TRANSMISSION BETWEEN A MICROPROCESSOR SYSTEM AND A TIME-DIVISION-MULTIPLEXED SYSTEM", U.S. Pat. No. 4,975,911. It should be noted that the auxiliary channel used to communicate with other devices on the line, (i.e. repeaters) and/or the CPE, is transferred by the C CHANNEL BUFFER.

MPSC 411 provides bit-level protocol functions, thereby, providing a highly reliable data link between the DFTC and UUT. MPSC 411 also provides a serial data link that can be connected to a terminal. This serial data link is intended to be used during development and testing of DFTC. In the present invention, MPSC has been implemented by a 8274 INTEL chip. Because of the relatively high data rate of these channels DMA controller 412 interfaces MPSC 411 to PROCESSOR COMPLEX 414. This allows data to be transferred between the MPSC and the PROCESSOR COMPLEX with very little processor over-head.

PROCESSOR COMPLEX 414 interfaces to the system through MESSAGE INTERFACE 415. Through this interface, the system passes high-level commands to the DFTC upon which the DFTC performs all the low-level computing and communications with the UUT.

FIG. 4 shows the processor complex in more detail. It is apparent that some of the components from FIG. 3 appear here also. From this figure it is obvious to a person of ordinary skill in the art that the processor complex is of a basic microprocessor configuration, however, there are a few additions. For example, this complex has an engineerable amount of NONVOLATILE RAM 504 for storing customer information. Also, there is a RAM KEY LOCK 503 which allows Microprocessor 514 to "write-protect" NONVOLATILE RAM 507 and 1K byte pages of RAM 504.

Figure 5:
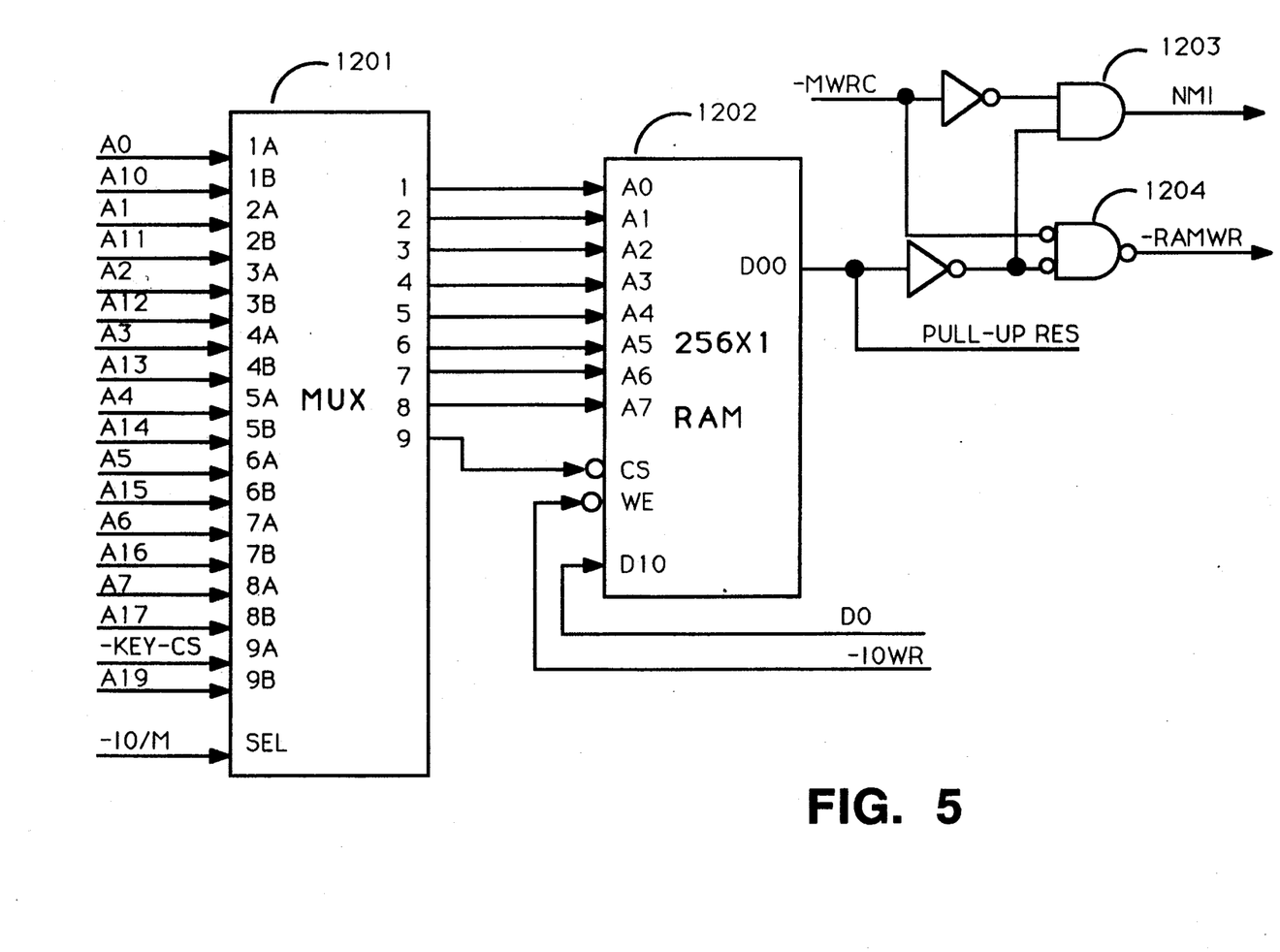
FIG. 5 is a schematic diagram of the Ram Key Lock.

Referring to FIG. 5, a schematic of the RAM KEY LOCK for the protection of RAM 504 (FIG. 4) is shown. The RAM KEY LOCK system consists of a MUX 1201, a KEY RAM 1202, and various logic. The basic principal of operation is as follows: When the processor accesses RAM ($-IO/M$ is a logic one), MUX 1201 selects the "B" inputs. The output of MUX 1201 becomes an address for KEY RAM 1202; KEY RAM 1202 outputs the data at that location. If the data bit was set to a logic one, then that page of RAM 504 is locked and may only be read. If the processor tries to write to a locked page, gate 1204 blocks the memory write pulse ($-MWRC$) such that the contents of RAM 504 are not changed. Simultaneously, gate 1203 sends a Non-Maskable Interrupt (NMI) to the processor signalling that it has illegally accessed RAM 504.

The processor locks/unlocks RAM pages by writing to KEY RAM 1202. Because the processor accesses KEY RAM as I/O instead of memory, $-IO/M$ is a logic low. This causes MUX 1201 to select the "A" inputs. The processor next asserts $-IOWR$ which writes the logic level of D0 into KEY RAM 1202. Again, because this is an I/O access, $-MWRC$ is a logic one and an NMI or $-RAMWR$ will not be generated.

Figure 6:
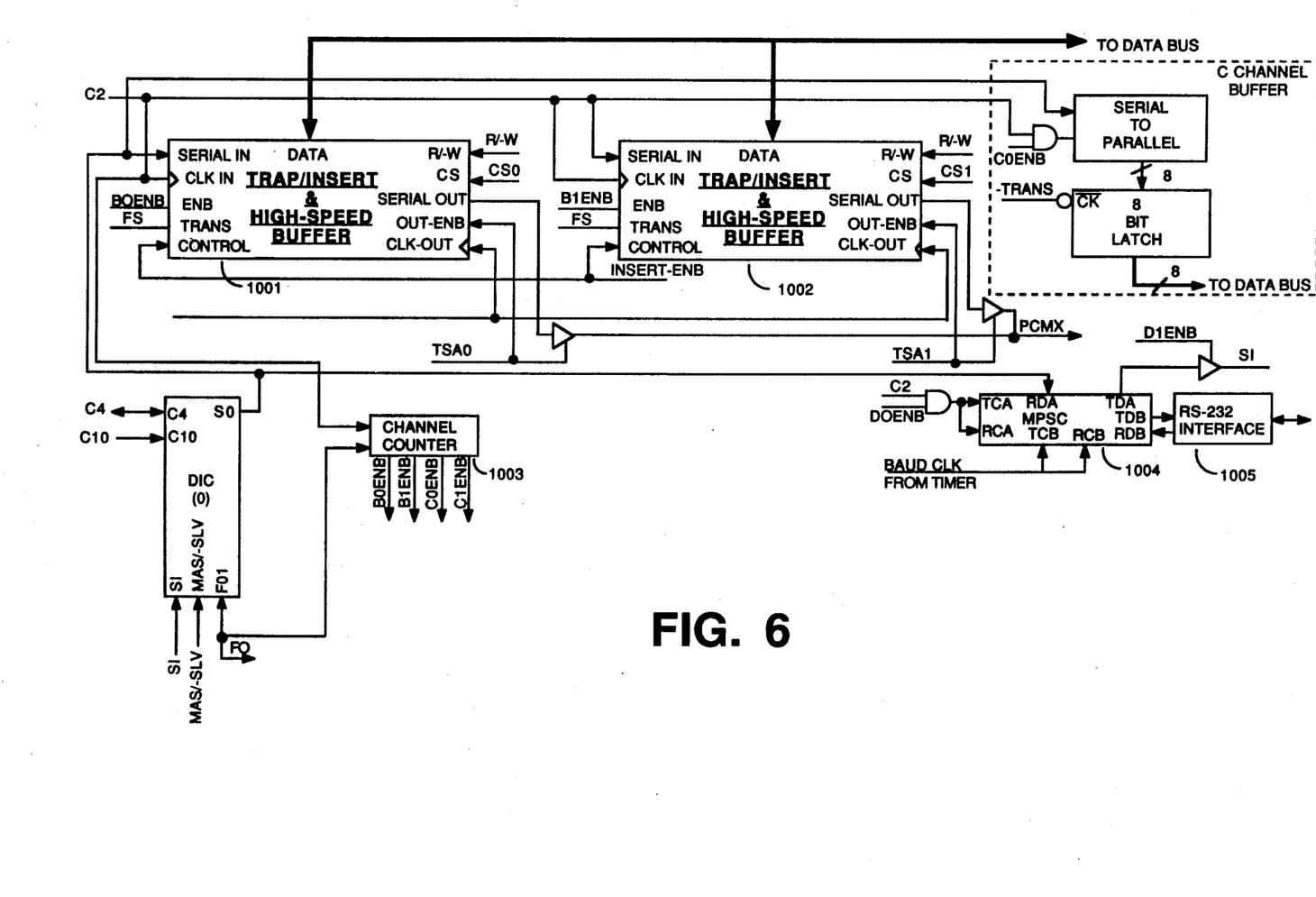
FIG. 6 is block diagram of the Receive Buffer.
Figure 7:
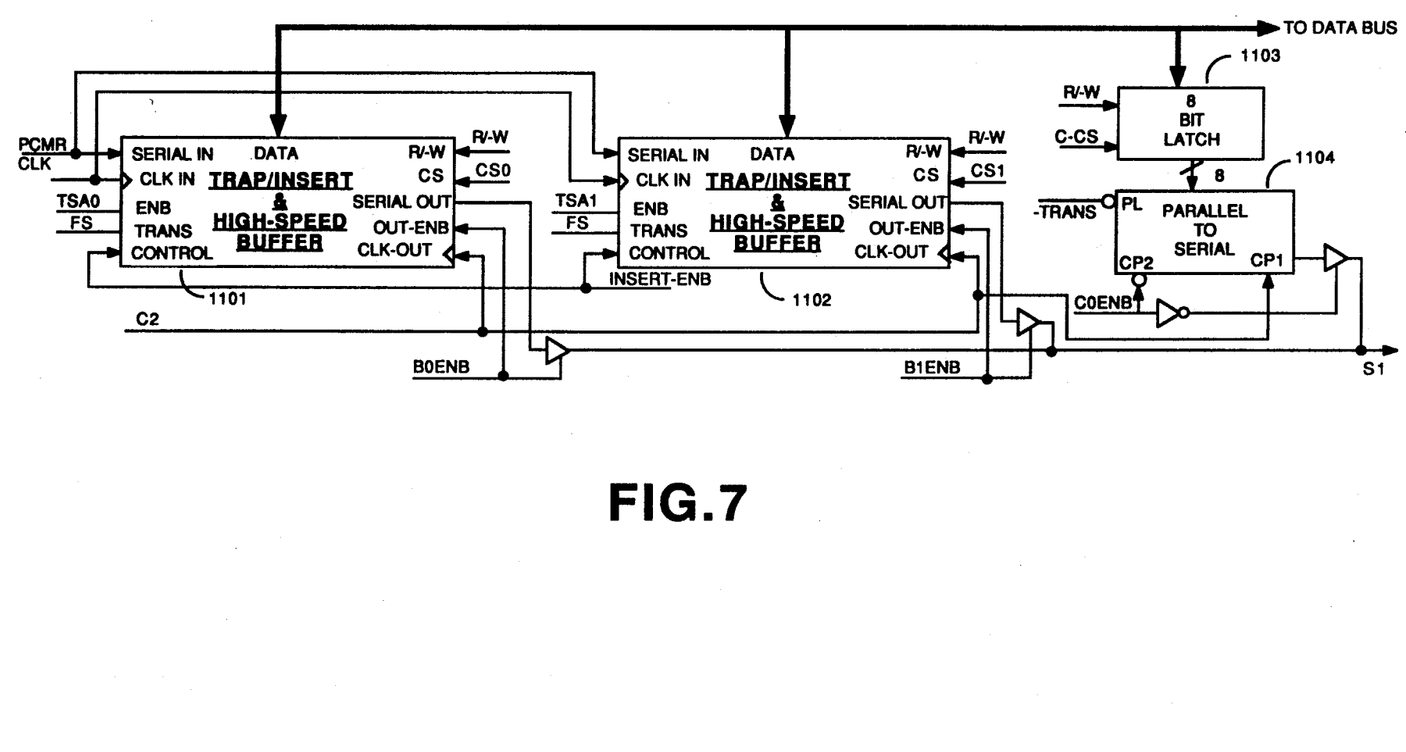
FIG. 7 is a block diagram of the Transmit Buffer.

Referring to FIGS. 6 and 7 the RECEIVE BUFFER and TRANSMIT BUFFER are shown in greater detail. These figures show that the RECEIVE BUFFER and TRANSMIT BUFFER are comprised of a total of four TRAP/INSERT & HIGH-SPEED BUFFERS 1001, 1002, 1101, and 1102 (shown in greater detail in FIG. 8). Also shown in these figures is part of the C CHANNEL BUFFER. The control logic for the C CHANNEL BUFFER is taught in application "AN INTERFACE CIRCUIT FOR DATA TRANSMISSION BETWEEN A MICROPROCESSOR, SYSTEM AND A TIME-DIVISION-MULTIPLEXED SYSTEM", U.S. Pat. No. 4,975,911. Finally, shown in FIG. 6 is the CHANNEL COUNTER 1003 which generates all the enable signals for identifying the time-slots of the DIC. With the present implementation, D0ENB is generated during the first two cycles of C2 after OF, C0ENB is generated six cycles later and stops eight cycles later, B0ENB is generated immediately after C0ENB is finished and continues for eight cycles of C2, and B1ENB is generated immediately after B0ENB is finished and continues for eight cycles of C2. C2 is generated by dividing C4 by two.

Figure 8:
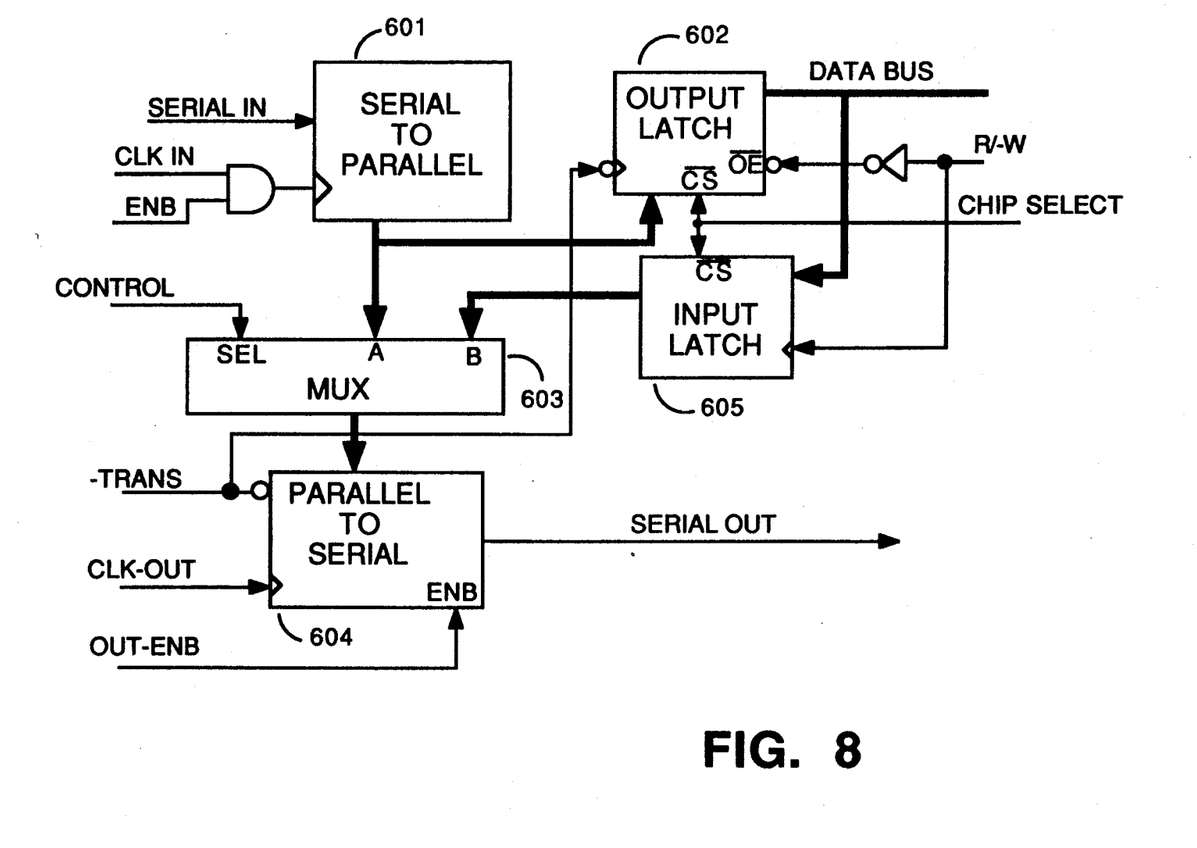
FIG. 8 is a block diagram of the Trap/Insert & High Speed Buffer.

Referring to FIG. 8 a TRAP/INSERT & HIGH-SPEED BUFFER is shown. This buffer has two modes of operation buffer and insert. The mode is determined by the status of CONTROL. In the buffer mode, MUX 603 selects the output of SERIAL-TO-PARALLEL converter 601. While in the insert mode, MUX 603 selects the output of INPUT LATCH 605. The output of MUX 603 is loaded into PARALLEL-TO-SERIAL converter 604 and, under the control of CLK-OUT and OUT-ENB, serially shifted out onto SERIAL OUT. The trap function is implemented by OUTPUT LATCH 602 which latches the parallel output of SERIAL-TO-PARALLEL converter 601. The processor interfaces by DATA BUS, R/$-$W, and CHIP SELECT. With the present invention, the processor is interrupted by the signal PCMVLD to the PROGRAMMABLE INTERRUPT CONTROLLER 413 of FIG. 3 when OUTPUT LATCH 602 is loaded.

Normally, the line card is the master of the system and the CPE is the slave. This means, the line card receives its timing information from the system and CPE receives its timing from the line. Because the DFTC tests both the CPE and other digital line cards, the DIC must be configurable as either master or slave. When the DIC is in Master mode, it must be supplied C4 and FO, while in the slave mode, the DIC generates C4 and FO. When the DIC is in the master mode C10, C4, and OF must be generated by the system, phase locked to each other, and phase locked to the system. CLOCK-GENERATOR 417 (FIG. 3) performs these functions. When in the slave mode the DIC generates C4 and OF which are phase locked to the signal received over the line interface. CLOCK-GENERATOR 417 (FIG. 3) generates C10 but C10 is not phase locked to any other signal; C2 is generated by dividing C4 by two.

Master/Slave mode changes the operation of TRAP/INSERT & HIGH-SPEED BUFFER, CLOCK-GENERATOR, and the DIC. The effects of mode on the TRAP/INSERT & HIGH-SPEED BUFFER and the DIC where discussed supra. In the Master mode CLOCK-GENERATOR 417 (FIG. 3) generates C10, C4, C2, and FO, all phase locked to FS from the system. In the present implementation: C10 is 10.24 MHz 50/50% duty cycle; C4 is 4.096 MHz 60/40% duty cycle, C2 is 2.048 MHz 50/50% duty cycle, and FO is 200 ns pulse every 125 us.

In the Slave mode CLOCK-GENERATOR 417 generates C10 but C10 is not phase locked to any other signal. CLOCK-GENERATOR 417 receives C4 and FO from the DIC and also generates C2 by dividing C4 by two.

CHANNEL COUNTER 1003 (FIG. 6) receives both FO and C2 and generates all the enable signals from this signals. It is apparent that with this arrangement, the enable signals are always generated at the proper time independent of the mode. It should also be noted that with the present implementation of the receive and transmit buffer that in the slave mode PCM data cannot reliable be transferred between the DIC and the system. To accomplish this would require another level of buffering, adding to both the cost of the card and data delay through the card.

In summary, because the DFTC tests both CPE and other digital line cards, the DIC must be configurable as either master or slave. In the master mode, all PCM related timing is derived from the system. While in the slave mode, all PCM related timing is derived from the line (i.e. the master) with the exception of C10 which is asynchronously generated locally.

Figure 9:
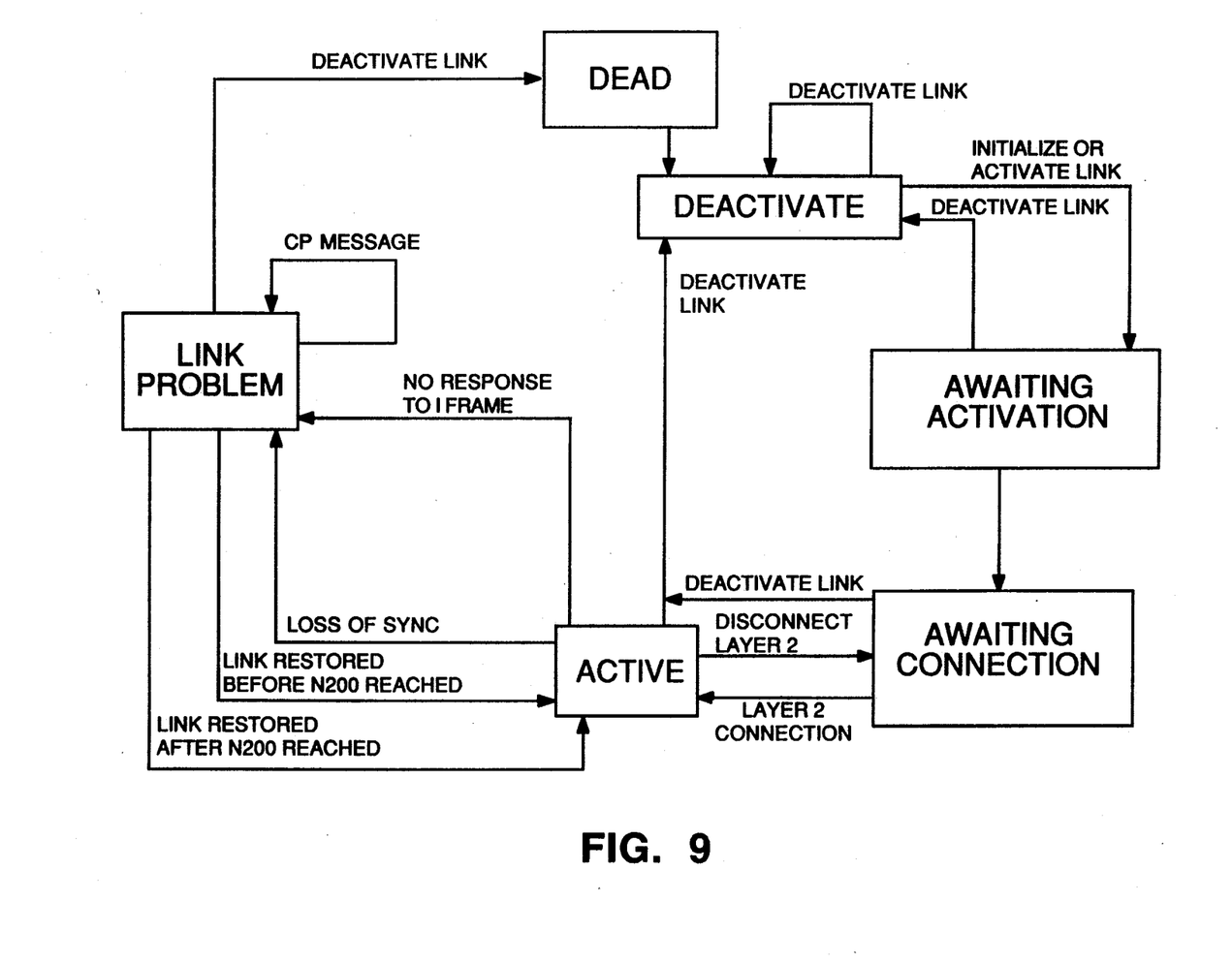
FIG. 9 is a state diagram showing the states of activation for the Digital Facilities Test Card.

Unlike a POTS line, the link between the DFTC and UUT is always active. Referring to FIG. 9, when the link is first activated or initialized, the various levels of the link must be connected. When the link is first powered-up, or first configured for testing of the link, the link is in the DEAD state. After performing initialization of the DFTC, the DEACTIVATE state is automatically entered. The link will stay in this state until the DFTC receives an INITIALIZE or ACTIVATE LINK message from the system.

After receiving an INITIALIZE or ACTIVATE LINK message the AWAITING ACTIVATION state is entered. During this time the line interface circuit is activated and time is allowed for the DFTC line interface and the UUT interface to synchronize. If, after a predetermined amount of time has passed, the line interfaces do not synchronize, the DFTC returns to the DEACTIVATE state, and an failure message is sent to the system.

After the line interfaces synchronize, the AWAITING CONNECTION state is entered. During this time the protocol controller of the DFTC and the UUT are allowed to synchronize. If, after a predetermined amount of time has passed, the protocol controllers do not synchronize, the DFTC returns to the DEACTIVATE state, and a failure message is sent to the system.

Once the protocol controllers synchronize, the DFTC enters the ACTIVE state. In this state, the DFTC's processor complex and the UUT's processor can exchange messages and testing can began. The ACTIVE state can be exited by: (1) A message from the system to deactivate; (2) The Protocol Controller losing synchronization; (3) The Line Interface losing synchronization, or; (4) The UUT not responding.

A DEACTIVATE message from the system causes the DFTC to change to the DEACTIVATE state. Should the protocol Controller lose synchronization, the AWAITING CONNECTION state is entered.

If the line interface loses synchronization or the UUT does not respond, the LINK PROBLEM state is entered. Here, there is an attempt to restore the link. If the link is restored prior to timer N200 expiring, the ACTIVE state is reentered, and a report is sent to the system. This type of outage is generally caused by a "glitch" on the line, or a marginal line, and is short in duration so that the protocol controllers do not lose synchronization. If the link is not restored prior to timer N200 expiring but before a predetermined time, the ACTIVE state is reentered, and a report is sent to the system. It may be necessary to enter the AWAITING CONNECTION state because the protocol controllers may have lost synchronization. If, after a predetermined amount of time, the link is not restored, the DEACTIVATE state is entered and an error report is sent to the system.

Now that the operating fundamentals have been discussed, the purpose of the card will be described. Please refer back to FIG. 2. This card has four major functions: 1) Operate as a standard digital line card which only supports one line; 2) Through the relay, temporarily replace a defective line card; 3) Up-load and Download data, and; 4) Test other digital lines and equipment. Items 1 and 2 are primarily described co-application "A DIGITAL PHONE SYSTEM", Ser. No. 07/615,528 filed on Nov. 19, 1990; item 3 is described in co-application "A METHOD OF DOWNLOADING DATA TO A PLURALITY OF DESTINATIONS IN A PHONE SYSTEM", Ser. No. 07/615,522 filed on Nov. 19, 1990. Item 4 will be discussed in more detail.

Much diagnostic information can be determined during the initial synchronization of FIG. 9. For example, if the DFTC cannot initialize the link such that the AWAITING ACTIVATION state can be entered then either the line is faulty or the UUT is completely dead. However if the AWAITING ACTIVATION state can be entered, the line is functional and the UUT is receiving power and clocking information. Next, if the ACTIVE state cannot be entered, the UUT's processor complex or its protocol controller is not functioning properly. Once the ACTIVE state is entered, if the DFTC can not exchange messages with the UUT then the UUT's processor complex is not functioning properly. If the LINK PROBLEM state is entered, the line is probably marginal, making a reliable link improbable.

Once the card has been placed in the proper mode (Master or Slave) and has synchronized with the other end, the DFTC can perform various tests to determine the status of the digital line and UUT. Status information from line interface 203 is transferred to processor complex 206 by the C-CHANNEL. From the status information the DFTC can approximate the quality of the link with the UUT. Another useful test sends data to the UUT and has the UUT return the data. This can be used to test all four channels of the system where PROCESSOR COMPLEX 206 is used to test the 8 Kbps auxiliary channel, PROTOCOL CONTROLLER 205 is used to test the 16 Kbps channel, and RECEIVE/TRANSMIT BUFFER 204 is used to test both 64 Kbps channels. During testing of each channel, PROCESSOR COMPLEX 206 will count the amount of data corrupted and determine a Bit-Error-Rate (BER) for that channel. If a BER is above a given threshold, then a problem message is sent to the system.

Although the preferred embodiment of the invention has been illustrated, and that form described, it will be readily apparent to those skilled in the art that various modifications may be made therein without departing from the spirit of the invention or from the scope of the appended claims.

What is claimed is:

1. A digital test card for testing the quality of a digital system in a central office system, said digital system includes a digital line card connected to a customer premise equipment by a two-wire digital connection, said digital test card comprising:

a line interface means for providing a full duplex transmission link between said digital test card and said digital system, when said digital test card is testing said customer premise equipment said line interface means operates as a master, when said digital test card is testing said digital line card said line interface means operates as a slave;

a buffer means connected to said line interface means and said central office system, said buffer means buffers data between said line interface means and said central office system, said buffer means further comprising:
(1) a receive trap means for trapping data from said line interface means and making said trapped data available to a processor means;
(2) a receive insert means for inserting data from said processor means, said inserted data being sent to said central office system;
(3) a transmit trap means for trapping data from said central office system and making said trapped data available to said processor means, and;
(4) a transmit insert means for inserting data from said processor means, said inserted data being sent to said line interface means;

a protocol controller means connected to said line interface means said protocol controller means performs a packet protocol, and;

said processor means connected to said protocol controlled means, said line interface means, said buffer means, and to said central office system, under the direction of said central office system, said processor means controls the operation of said digital test card, and said processor means, through said protocol controller means and said buffer means, determines the quality of said digital system.

2. A digital test card as claimed in claim 1, said processor means further comprising:
a microprocessor means arranged to control the operations of said digital test card;
a Read Only Memory (ROM) for storing a boot program used by said microprocessor means, and;
a Random Access Memory (RAM) means used by said microprocessor means for storing an operating program and for temporary storage.

3. A digital test card as claimed in claim 2, said processor means further comprising:
a NonVolatile RAM (NVRAM) means for retention of data when power to said digital test card is removed, and;
a Keylock means connected to said microprocessor means, said RAM means, and said NVRAM means, said Keylock means allows said microprocessor means to lock said NVRAM means and to lock individual pages of said RAM means such that said microprocessor means can only read said locked NVRAM means and said locked individual pages of said RAM means.

4. A digital test card as claimed in claim 2, said processor means further comprising a Direct Memory Access (DMA) means connected to said protocol controller means, said RAM means, and said microprocessor means, said DMA means arranged to transfer data between said protocol controller means and said RAM means independent of said microprocessor means.

5. A digital test card as claimed in claim 2, said processor means further comprising a message interface means connected between said microprocessor means and said central office system, said message interface means provides a communication channel between said microprocessor means and said central office system.

6. A digital test card as claimed in claim 1, said digital test card further comprising a relay means for connecting said line interface means to said customer premise equipment, in the alternative said relay means connects said line interface means to said digital line card.

7. A digital test card for testing the quality of a digital system in a central office system, said digital system includes a digital line card connected to a customer premise equipment by a two-wire digital connection, said digital test card comprising:
a line interface means for providing a full duplex transmission link between said digital test card and said digital system, when said digital test card is testing said customer premises equipment said line interface means operates as a master, when said digital test card is testing said digital line card said line interface means operates as a slave;
a relay means for connecting said line interface means to said customer premise equipment, int he alternative said relay means connects said line interface means to said digital line card;
a receive buffer means for buffering data from said line interface means to said central office system;
a transmit buffer means for buffering data from said central office system to said line interface means;
a protocol controller means connected to said line interface means, said protocol controller means performs a packet protocol;
a microprocessor means arranged to control the operations of said digital test card;
a Read Only Memory (ROM) for storing a boot program used by said microprocessor means;
a Random Access Memory (RAM) means used by said microprocessor means for storing an operating program and for temporary storage;
A NonVolatile RAM (NVRAM) means for retention of data when power to said digital test card is removed;
a Keylock means connected to said microprocessor means, said RAM means, and said NVRAM means, said Keylock means allows said microprocessor means to lock said NVRAM means and to lock individual pages of said RAM means such that said microprocessor means can only read said locked NVRAM means and said locked individual pages of said RAM means;
a Direct Memory Access (DMA) means connected to said protocol controller means, said RAM means, and said microprocessor means, said DMA means arranged to transfer data between said protocol controller means and said RAM means independent of said microprocessor means, and;
a message interface means connected between said microprocessor means and said central office system, said message interface means provides a communication channel between said microprocessor means and a processor in said central office system.

8. A digital test card as claimed in claim 7, said digital test card further comprising:
a clock generator means for generating a first plurality of clock signals, said clock generator means phase locks to a master clock from said central office system when said line interface means operates as said master, and;
a timeslot assigner means for generating a second plurality of clock signals derived from said master clock.

9. A digital test card as claimd in claim 8, wherein:
said receive buffer means comprises a receive serial-to-serial converter means connected to said line interface means and said central office system, said receive serial-to-serial converter means arranged to receive said first plurality of clock signals and said second plurality of clock signals, said receive serial-to-serial converter means converts data between a first serial rate from said line interface means and a second serial rate from said central office system;

said transmit buffer means comprises a transmit serial-to-serial converter means connected to said central office system and said line interface means, said transmit serial-to-serial converter means arranged to receive said first plurality of clock signals and said second plurality of clock signals, said transmit serial-to-serial converter means converts data between said first serial rate from said line interface means and said second serial rate from said central office system;

said first plurality of clock signals enables said receive serial-to-serial converter means when said line interface means is ready to transmit data, and, said first plurality of clock signals enables said transmit serial-to-serial converter means when said line interface means is ready to receive data, and;

said second plurality of clock signals enables said receive serial-to-serial converter means when said central office system is ready to receive data, and, said second plurality of clock signals enables said transmit serial-to-serial converter means when said central office system is ready to transmit data.

10. A digital test card as claimed in claim 9, said receive serial-to-serial converter means further comprising:
- a receive trap means for trapping data from said line interface means and making said trapped data available to said processor means, and;
- a receive insert means for inserting data from said processor means, said inserted data is sent to said central office system.

11. A digital test card as claimed in claim 9, said transmit serial-to-serial converter means further comprising:
- a transmit trap means for trapping data from said central office system and making said trapped data available to said processor means, and;
- a transmit insert means for inserting data from said processor means, said inserted data is sent to said line interface means.

12. A digital test card for testing the quality of a digital system in a central office system, said digital system includes a digital line card connected to a customer premise equipment by a two-wire digital connection, said digital test card comprising:
- a line interface means for providing a full duplex transmission link between said digital test card and said digital system, when said digital test card is testing said customer premises equipment said line interface means operates as a master, when said digital test card is testing said digital line card said line interface means operates as a slave;
- a relay means for connecting said line interface means to said customer premise equipment, in the alternative said relay means connects said line interface means to said digital line card;
- a receive buffer means connected to said line interface means and said central office system, said receive rubber means buffers data from said line interface means to said central office system, said receive buffer means comprises:
  - a receive trap means for trapping receive data from said line interface means and making said trapped receive data available to a processor means, and;
  - a receive insert means for inserting data from said processor means, said inserted data is sent to said central office system;
- a transmit buffer means connected to said line interface means and said central office system, said transmit buffer means buffers data from said central office system to said line interface means, said transmit buffer means comprises:
  - a transmit trap means for trapping transmit data from said central office system and making said trapped transmit data available to said processor means, and;
  - a transmit insert means or inserting data from said processor means, said inserted data is sent to said line interface means;
- a protocol controller means connected to said line interface means, said protocol controller means performs a packet protocol, and;
- a processor means connected to sad protocol controller means, said line interface means, said receive buffer means, said transmit buffer means, and to said central office system, under the direction of said central office system, said processor means controls the operation of said digital test card, and said processor means, through said protocol controller means and said receive buffer means and said transmit buffer means, determines the quality of said digital system.

* * * * *